Patented Dec. 11, 1923.

1,477,132

UNITED STATES PATENT OFFICE.

MANZABURO KUSHIRO, OF PASADENA, CALIFORNIA.

YEAST COMPOSITION AND METHOD OF MAKING THE SAME.

No Drawing.  Application filed October 23, 1922. Serial No. 596,516.

*To all whom it may concern:*

Be it known that I, MANZABURO KUSHIRO, a subject of the Emperor of Japan, and a resident of Pasadena, in the county of Los Angeles and State of California, have invented a new and useful Yeast Composition and Method of Making the Same, of which the following is a specification.

This invention relates to the manufacture of a fermenting yeast, and especially a rice fermenting yeast, and the principal object is to provide a yeast for fermentation, in which the products obtained by its use, can stand for a longer time than if ordinary yeast is used, and other objects are to provide a yeast which will keep without deterioration for a long time and which in use works a quick fermentation, being particularly rapid in action, and remaining free from detrimental ingredients.

In carrying the present invention into effect the product consists of the following ingredients and proportions, the latter of which may be varied without departing from the nature of the invention. I use in its manufacture, rice, cultured yeast, and juice or solution of hops.

To prepare the hop juice, or a solution thereof, I take one ounce of hops and add thereto one pint of water, and boil the same about thirty minutes. I then strain the boilerd material with a cloth strainer and set the solution aside.

I then take one hundred pounds of cleaned rice and wash it and leave it in clean water for about twenty hours, after which I remove it from the water and drain the same. I then place the rice into a screen steamer or cooker, consisting of a closed receptacle, having a series of screen bottomed trays superimposed one above another therein, and apply steam to the rice until it is well boiled or cooked. When the rice is well cooked, I then add the prepared hop juice and allow the rice to thoroughly absorb the same. I then take out the boiled rice and spread it out to cool it. When the temperature has fallen to about 95° F. in temperature, I add and mix therewith, an artificial or cultured yeast.

For one hundred pounds of rice, the proportion of hop juice is about four pints, and the proportion of artificial or cultured yeast is about two ounces.

I then place the mixture of rice, hop juice and yeast into another and a special receptacle, the chamber of which may be closed to exclude all outside air, and cover the rice mixture with a cloth which serves to retain the heat.

After standing for about two hours, I agitate and crumble the rice to separate the kernels thereof from one another, and cover the rice as before. After standing for a period of about fourteen or fifteen hours, I repeat the agitation and crumbling of the rice, and cover as before.

After standing for another period of about five hours, I then put the rice on a series of shallow-edged trays, which are stacked one above another and separated or spaced apart by suitable cleats within the said receptacle. Seven or eight hours later, I then stir the contents of each tray. Then after another period of from ten to fifteen hours, the yeast culture having spread over the rice, I take the trays from the chamber, and dry the rice fermenting yeast product in a dry atmosphere. The most suitable temperature for the receptacle chamber for conducting this process, I have found to be about eighty-two or eighty-three degrees F.

For the process conducted within the receptacle chamber, I employ steam which is admitted to the bottom of the receptacle, or screen steamer, and on the first or bottom screen therein place a quantity of saturated hops; the remaining and superposed screens having thereon the rice to be steamed or cooked. As the steam first passes through the saturated hops, the rice will also absorb a small quantity of the hop constituents from the steam.

The yeast culture, which I employ in this process belongs to the order of vegetable ferments called "Saccharomycetes," and the particular species thereof which I have found to be the most suitable and practicable, for the purpose of my invention, is "Saccharomyces sake yabe."

The hop oil, alkaloids and resins, obtained from the hops, are protective against lactic and acetic ferment, thus preserving the yeast product from deterioration from these causes, and further protect against "bacteria and other germs" which would cause oxidation, decomposition, and other poisonous effects.

What is claimed is:

1. The process of making yeast, comprising soaking a quantity of rice in clean water for about twenty hours, then draining the same, then steaming the soaked rice in a screen steamer until it is well cooked, then adding a strong solution of hop juice to the rice until it is thoroughly saturated and will not absorb any more, then spreading the rice out to cool until the remaining temperature is about 95 degrees, then adding a small quantity of cultured yeast of the species "Saccharomyces sake yabe," then thoroughly mixing the rice and yeast together, then placing the same in a chamber which may be hermetically sealed to exclude the air and covering the rice with a cloth to retain the heat, then after a period of two hours agitating and crumbling the rice to separate the kernels, and again covering and heating as before, then after another period of from fourteen to fifteen hours, repeating the agitating and crumbling of the rice, then repeating the agitation of the rice after a period of seven to eight hours, then after a period of from ten to fifteen hours, or when the yeast culture has spread over and mixed with the rice, removing the same from the closed chamber and drying the same in a dry atmosphere.

2. The herein described process of making yeast, consisting of soaking a quantity of rice in clean water for about twenty hours, then draining the same, then steaming the rice in a screen steamer until it is well cooked, the steaming step including the placing of a quantity of hops saturated with water and first passing the steam through the saturated hops in the bottom of the steam cooker and thence through the rice on screens superposed above the layer of saturated hops, then after the cooking step, spreading the cooked rice out to cool until its remaining temperature is about 95° F., then adding a small quantity of cultured yeast of the species "Saccharomyses sake yabe," then thoroughly mixing the rice and yeast together, then placing the same in a chamber which may be hermetically sealed to exclude the air and covering the rice within the chamber with a cloth to retain the heat, then, after a period of two hours, agitating and crumbling the rice to separate the kernels, and again covering and heating the rice as before, then after another period of from fourteen to fifteen hours, repeating the agitating and crumbling of the rice, and again covering with a cloth and heating the rice, then repeating the agitating and crumbling step after a period of from seven to eight hours, and then, after a period of from ten to fifteen hours, or when the yeast culture has spread over the rice, finally removing the same from the closed chamber and drying the rice in a dry atmosphere.

In testimony whereof, I hererunto affix my signature.

MANZABURO KUSHIRO.